United States Patent

Saegusa

[11] Patent Number: 5,586,798
[45] Date of Patent: Dec. 24, 1996

[54] CURVED WINDOW GLASS PANEL AND METHOD OF INSTALLING CURVED WINDOW GLASS PANEL ON AUTOMOBILE BODY

[75] Inventor: Hiroyuki Saegusa, Utsunomiya, Japan

[73] Assignee: Honda Giken Kogyo Kabushiki Kaisha, Tokyo, Japan

[21] Appl. No.: 571,019

[22] Filed: Dec. 12, 1995

Related U.S. Application Data

[63] Continuation of Ser. No. 188,413, Jan. 24, 1994, abandoned.

[30] Foreign Application Priority Data

Jan. 25, 1993 [JP] Japan ................................. 5-028681

[51] Int. Cl.[6] .......................................................... B60J 1/18
[52] U.S. Cl. ............................... 296/146.15; 296/96.21; 296/201; 52/204.64
[58] Field of Search ............................. 296/96.21, 146.8, 296/146.15, 201; 49/462; 52/208, 204.62, 204.64, 204.591

[56] References Cited

U.S. PATENT DOCUMENTS

| 3,228,156 | 1/1966 | Hitzelberger | 52/208 |
|---|---|---|---|
| 5,158,628 | 10/1992 | Tressler | 156/108 |

FOREIGN PATENT DOCUMENTS

| 304694 | 3/1989 | European Pat. Off. | 296/201 |
|---|---|---|---|
| 3414394 | 10/1985 | Germany | 296/201 |
| 3501115 | 7/1986 | Germany | 296/201 |
| 3821457 | 12/1989 | Germany | 296/96.21 |
| 3843081 | 7/1990 | Germany | 296/96.21 |
| 8030825 | 2/1983 | Japan | 296/146.15 |
| 6053425 | 3/1985 | Japan | 296/146.15 |
| 0166519 | 8/1985 | Japan | 296/146.15 |
| 0226321 | 11/1985 | Japan | 296/96.21 |
| 226377 | 11/1985 | Japan | 296/146.15 |
| 61-95630 | 6/1986 | Japan . | |
| 0184520 | 7/1988 | Japan | 296/201 |
| 2138479 | 10/1984 | United Kingdom | 296/146.15 |

*Primary Examiner*—Dennis H. Pedder
*Attorney, Agent, or Firm*—Armstrong, Westerman, Hattori, McLeland & Naughton

[57] ABSTRACT

Holders are mounted on the inner surfaces of respective bent end portions of a curved window glass panel for engaging respective guide surfaces on an attachment frame on an automobile body. When the curved window glass panel is pressed against the attachment frame, the holders are engaged and guided by the guide surfaces to bring the curved window glass panel into a predetermined position with respect to the attachment frame. Sealers are mounted on the inner surfaces of the bent end portions and on respective sealer retainers that are also disposed on the inner surfaces of the bent end portions. The sealers project in the direction in which the curved window glass panelets pressed against the attachment frame. When the curved window glass panel is pressed against the attachment frame, the sealers are securely pressed between the curved window glass panel and the attachment frame. Each of the sealer retainers extends along a peripheral edge of one of the bent end portions.

4 Claims, 7 Drawing Sheets

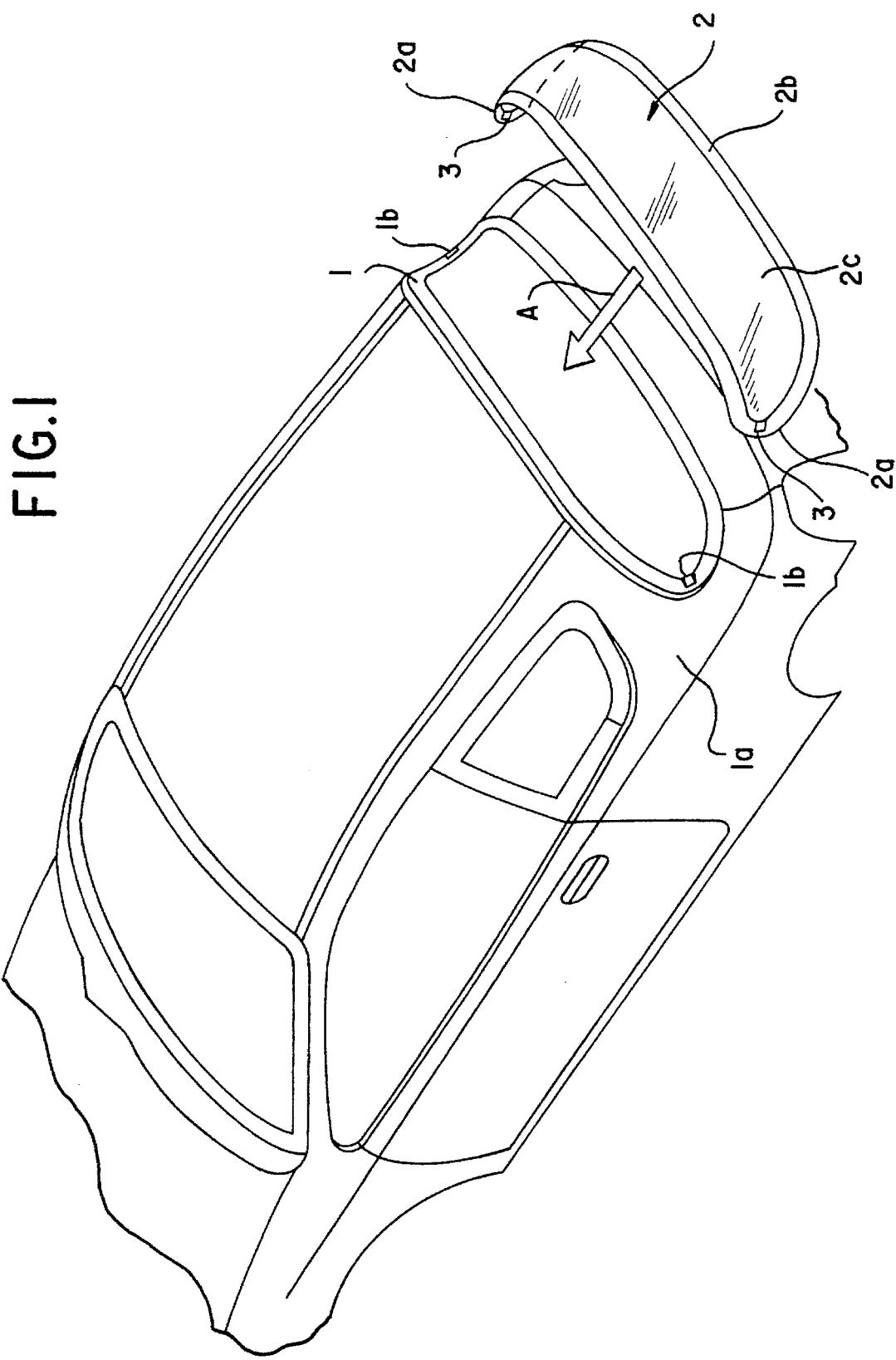

CURVED WINDOW GLASS PANEL AND METHOD OF INSTALLING CURVED WINDOW GLASS PANEL ON AUTOMOBILE BODY

This application is a continuation of application Ser. No. 08/188,413 filed Jan. 24, 1994, now abandoned.

BACKGROUND OF THE INVENTION

1. Field of the Invention

The present invention relates to a curved window glass panel and a method of installing a curved window glass panel on an attachment frame on an automobile body by pressing the curved window glass panel against the attachment frame, and more particularly to a curved window glass panel, such as a rear window glass panel, which has a pair of end portions bent over opposite sides of an automobile body, and a method of installing such a curved window glass panel reliably on an attachment frame without the danger of water leakage through the attached edge of the curved window glass panel.

2. Description of the Related Art

Recent automobile design trends include a rear window panel as shown in FIG. 6 of the accompanying drawings. As shown in FIG. 6, a curved window glass panel 12 has a pair of large end portions 12a bent forward over opposite sides 11a of an automobile body through a large angle. The curved window glass panel 12 has a peripheral edge coated with a decorative ceramic color layer 12b.

FIG. 7A of the accompanying drawings shows a curved window glass panel 13 having a pair of end portions 13a each bent through an angle α of 130° or greater. To install the curved window glass panel 13 on an attachment frame, a sealer is disposed on and projects from the inner peripheral edge of the curved window glass panel 13, and the curved window glass panel 13 is pressed against the attachment frame through the sealer, so that the curved window glass panel 13 is bonded to the attachment frame without the danger of water leakage.

FIG. 7B of the accompanying drawings illustrates a curved window glass panel 14 having a pair of end portions 14a each bent through an angle α ranging from 90° to 130°. Since a more complex process is required to shape and bend the curved window glass panel 14 than the curved window glass panel 13 shown in FIG. 7A and the attachment frame for installing the curved window glass panel 14 thereon also requires more complicated machining than the attachment frame for installing the curved window glass panel 13, it is relatively difficult to achieve predetermined dimensional accuracy for the curved window glass panel 14 and the attachment frame for installing same thereon.

As shown in FIG. 8 of the accompanying drawings, each of the bent end portions 12a of the curved window glass panel 12 shown in FIG. 6 is pressed against an attachment frame 10 while the bent end portion 12a is being inclined to the direction indicated by the arrow A in which the curved window glass panel 12 moves for installation. At this time, a sealer 15 projecting from the inner surface of the peripheral edge of the curved window glass panel 12 has a side face held against the attachment frame 10 because the curved window glass panel 12 moves in the direction A for installation. Therefore, when the curved window glass panel 12 is subjected to lateral forces, the sealer 15 tends to be damaged or cause water leakage by being laterally bent or sheared.

More sharply curved window glass panels are liable to be installed less accurately owing to relatively low dimensional accuracy. When they are laterally displaced due to poor installation accuracy, there may be developed a step or a gap between the automobile body and the curved window panel, impairing the appearance of the automobile body. Such a positional displacement of the curved window glass panel is also responsible for water leakage through the sealer. The curved window glass panels that are positionally displaced with respect to the automobile body lose their commercial values in terms of design and function.

One customary practice to eliminate the above problems has been to manually adjust a curved window glass panel and an attachment frame on which it is to be installed, and then manually install the curved window glass panel on the attachment frame while laterally balancing the curved window glass panel.

If a curved window glass panel is installed on an attachment frame with an automatic installing machine, then it is necessary to detect manufacturing errors of the curved window glass panel and the attachment frame, and correct the installation process based on the detected manufacturing errors. The automatic installing machine is required to be controlled in a manner depending on the type of window glass panel, such as a rear window glass panel, that is to be installed. Accordingly, a dedicated installation line having dedicated automatic installing machines is needed, and a large expenditure of equipment investments is unavoidable for establishing such a dedicated installation line.

SUMMARY OF THE INVENTION

It is an object of the present invention to provide a curved window glass panel which can be installed on an attachment frame on an automobile body with high positional accuracy and high sealing capability.

Another object of the present invention is to provide a method of installing a curved window glass panel on an attachment frame on an automobile body with high positional accuracy and high sealing capability.

According to the present invention, there is provided a method of installing a curved window glass panel having a pair of bent end portions on an attachment frame on an automobile body, comprising the steps of attaching a pair of holders respectively to inner surfaces of the bent end portions of the curved window glass panel, the holders having respective hook fingers for engaging the attachment frame to guide the curved window glass panel into a predetermined position with respect to the attachment frame, and pressing the curved window glass panel against the attachment frame while the hook fingers are being guided by the attachment frame to guide the curved window glass panel into the predetermined position with respect to the attachment frame.

According to the present invention, there is also provided a method of installing a curved window glass panel having a pair of bent end portions on an attachment frame on an automobile body, the bent end portions having a pair of holders respectively on inner surfaces thereof and a pair of sealers respectively on inner surfaces thereof, the attachment frame having a pair of guide surfaces on respective end portions thereof, the method comprising the step of pressing the curved window glass panel against the attachment frame to cause the guide surfaces to guide the holders, respectively, for thereby bringing the curved window glass panel into a predetermined position with respect to the attachment frame, and also to cause the sealers to be pressed between the curved window glass panel and the attachment frame.

According to the present invention, there is further provided a curved window glass panel for being installed on an attachment frame on an automobile body, comprising a central panel portion, and a pair of bent end portions extending from opposite ends of the central panel portion, the bent end portions having a pair of holders, respectively, on respective inner surfaces thereof for engaging the attachment frame to guide the curved window glass panel into a predetermined position with respect to the attachment frame when the curved window glass panel is pressed against the attachment frame.

The bent end portions may have a pair of sealer retainers respectively to inner surfaces thereof, the sealer retainers having respective slanted seat surfaces slanted with respect to the inner surfaces of the bent end portions, and a pair of sealers disposed on the slanted seat surfaces, respectively, the sealers projecting in the direction in which the curved window glass panel is pressed against the attachment frame.

The bent end portions may be bent through an angle ranging from 90° to 130°.

When the curved window glass panel is pressed against the attachment frame, the holders are engaged and guided by the guide surfaces to bring the curved window glass panel into a predetermined position with respect to the attachment frame. At the same time, the sealers are securely pressed between the attachment frame and the sealer retainer.

The above and further objects, details and advantages of the present invention will become apparent from the following detailed description of a preferred embodiment thereof, when read in conjunction with the accompanying drawings.

BRIEF DESCRIPTION OF THE DRAWINGS

FIG. 1 is an exploded fragmentary perspective view showing the manner in which a curved window glass panel is installed on an attachment frame according to the present invention;

DETAILED DESCRIPTION OF THE PREFERRED EMBODIMENT

Figure 2A:
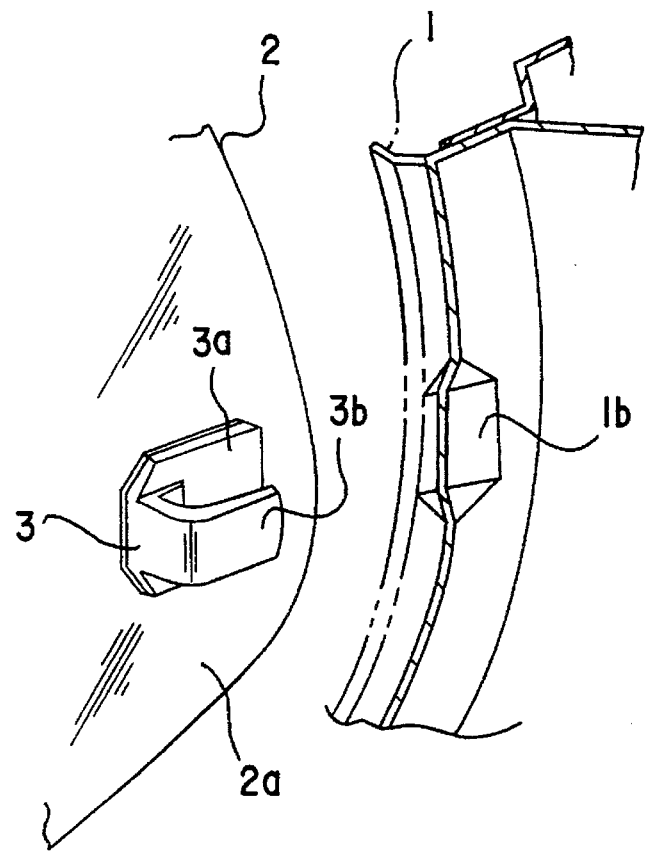
FIG. 2A is a fragmentary perspective view of a holder and the attachment frame.

As shown in FIG. 1, a curved rear window glass panel 2 is installed on a rear window attachment frame 1 on an automobile body by being pressed against the rear window attachment frame 1. The curved rear window glass panel 2 has a central panel portion 2c and a pair of end portions 2a extending to taper away from opposite ends of the central panel portion 2c and bent over opposite sides 1a of the automobile body through an angle ranging from 90° to 130°. The attachment frame 1 that is mounted on the automobile body has a shape substantially complementarily to the peripheral edge of the curved rear window glass panel 2.

The curved rear window glass panel 2 has a pair of holders 3 disposed respectively on the inner surfaces of the tip ends of the tapered end portions 2a thereof, as shown in FIG. 2A. When the curved rear window glass panel 2 is moved toward and pressed against the rear window attachment frame 1 in the direction indicated by the arrow A, the holders 3 engage the attachment frame 1 to guide the peripheral edge of the curved rear window glass panel 2 into a predetermined position with respect to the rear window attachment frame 1.

Figure 2B:
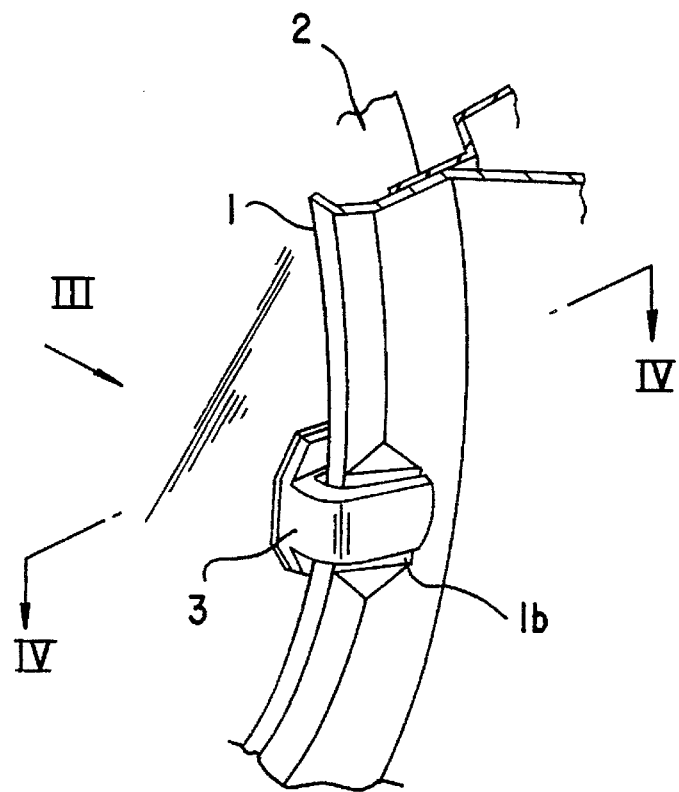
FIG. 2B is a fragmentary perspective view of the holder and the attachment frame that are assembled with each other.

As shown in FIG. 1, the rear window attachment frame 1 has a pair of slanted guide surfaces 1b (only one shown) on respective end portions thereof converged to come close to opposite sides 1a of the automobile body. When the curved rear window glass panel 2 is moved toward and pressed against the rear window attachment frame 1, the guide surfaces 1b engage and guide the holders 3, respectively, as shown in FIG. 2B.

Figure 3:
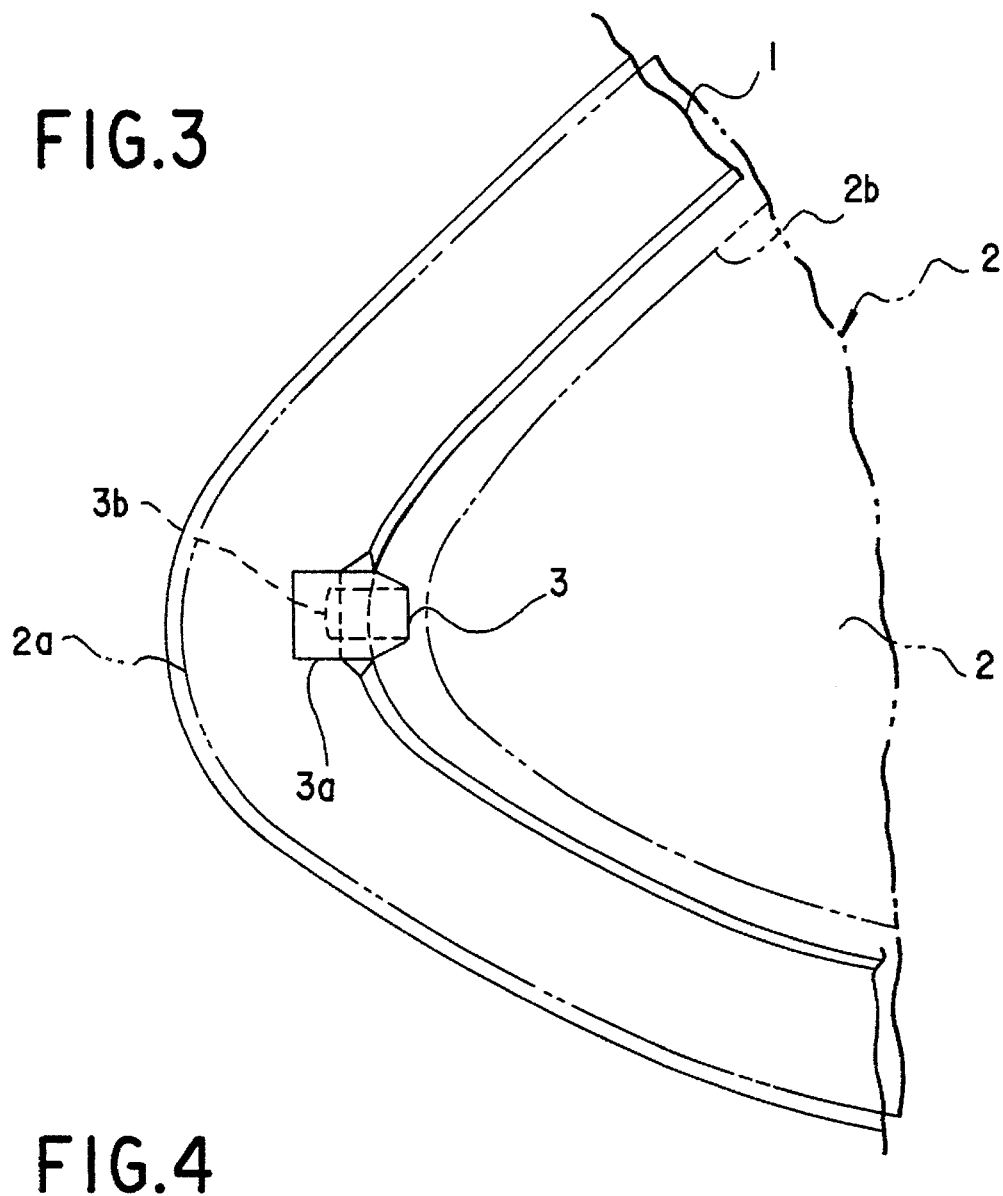
FIG. 3 is a fragmentary side elevational view as viewed in the direction indicated by the arrow III in FIG. 2B.
Figure 4:
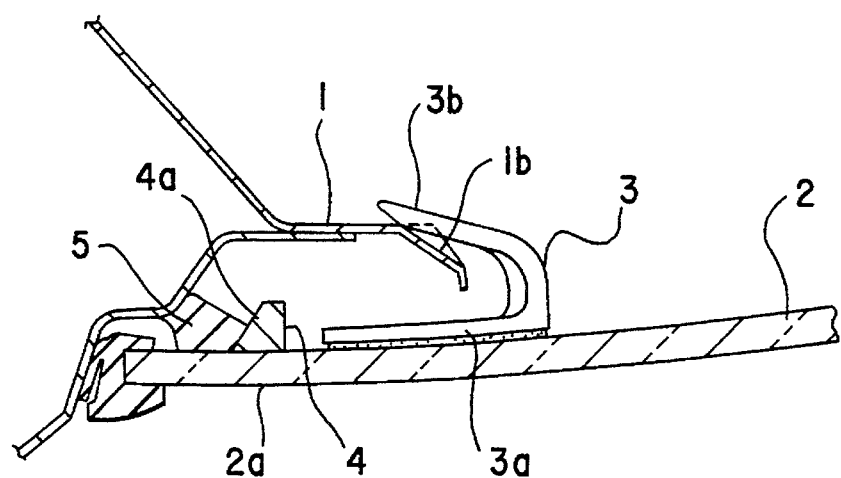
FIG. 4 is a cross-sectional view taken along line IV—IV of FIG. 2B.

As shown in FIGS. 2A, 3, and 4, each of the holders 3 has a base 3a bonded to one of the inner surfaces of the tip ends of the tapered end portions 2a of the curved rear window glass panel 2, and a hook finger 3b projecting from the base 3a in spaced relation to the inner surface of the curved rear window glass panel 2.

As shown in FIG. 4, a sealer retainer 4 having a slanted seat surface 4a is mounted on each of the inner surfaces of the end portions 2a of the curved rear window glass panel 2, the slanted seat surface 4a being slanted with respect to the inner surface of the end portion 2a. A sealer 5 is mounted on each of the inner surfaces of the end portions 2a of the curved rear window glass panel 2 and also on the seat surface 4a of the sealer retainer 4. The sealer 5 projects in the direction in which the curved rear window glass panel 2 is pressed toward the rear window attachment frame 1.

Figure 5:
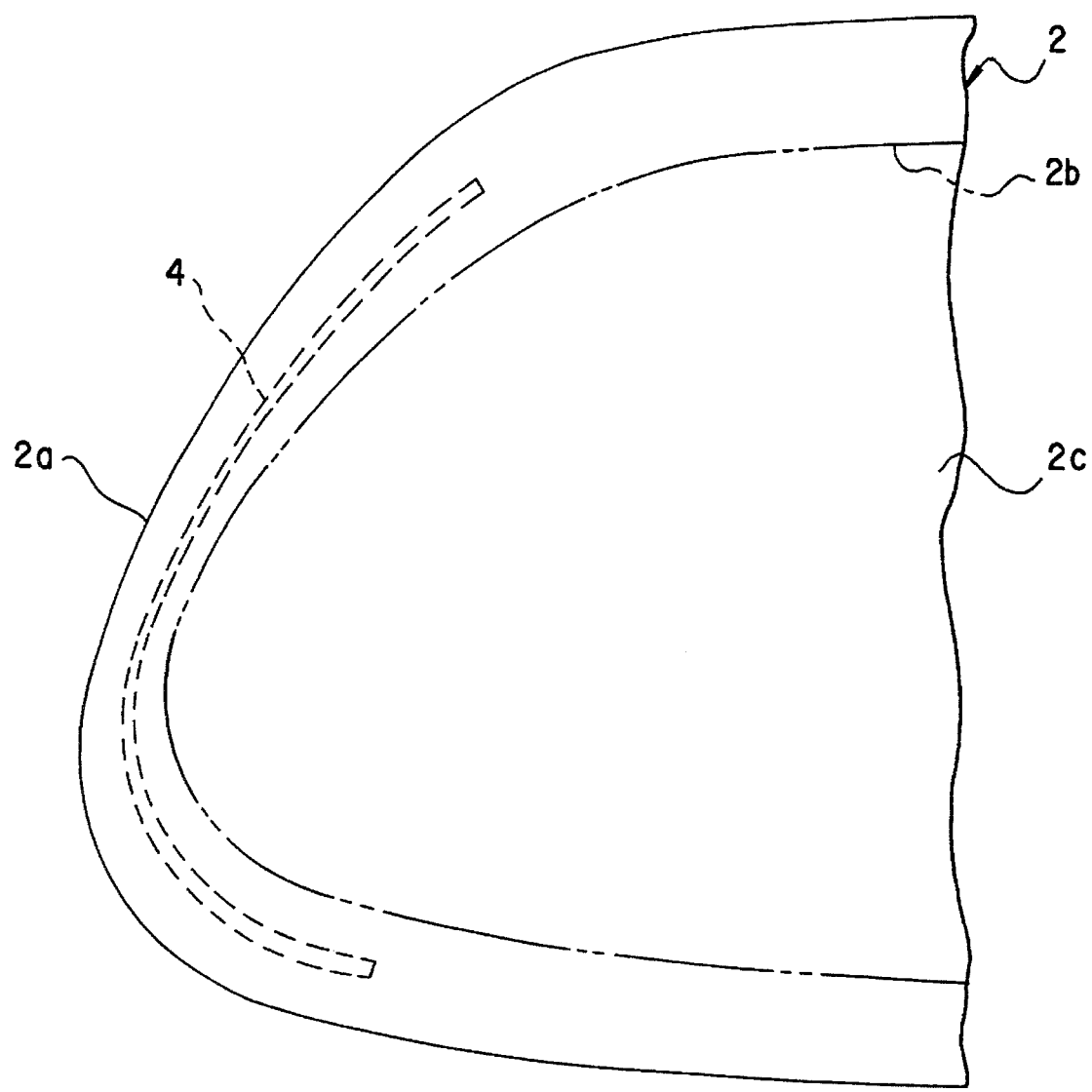
FIG. 5 is a fragmentary side elevational view of an end portion of the curved window glass panel with a sealer retainer.
Figure 6:
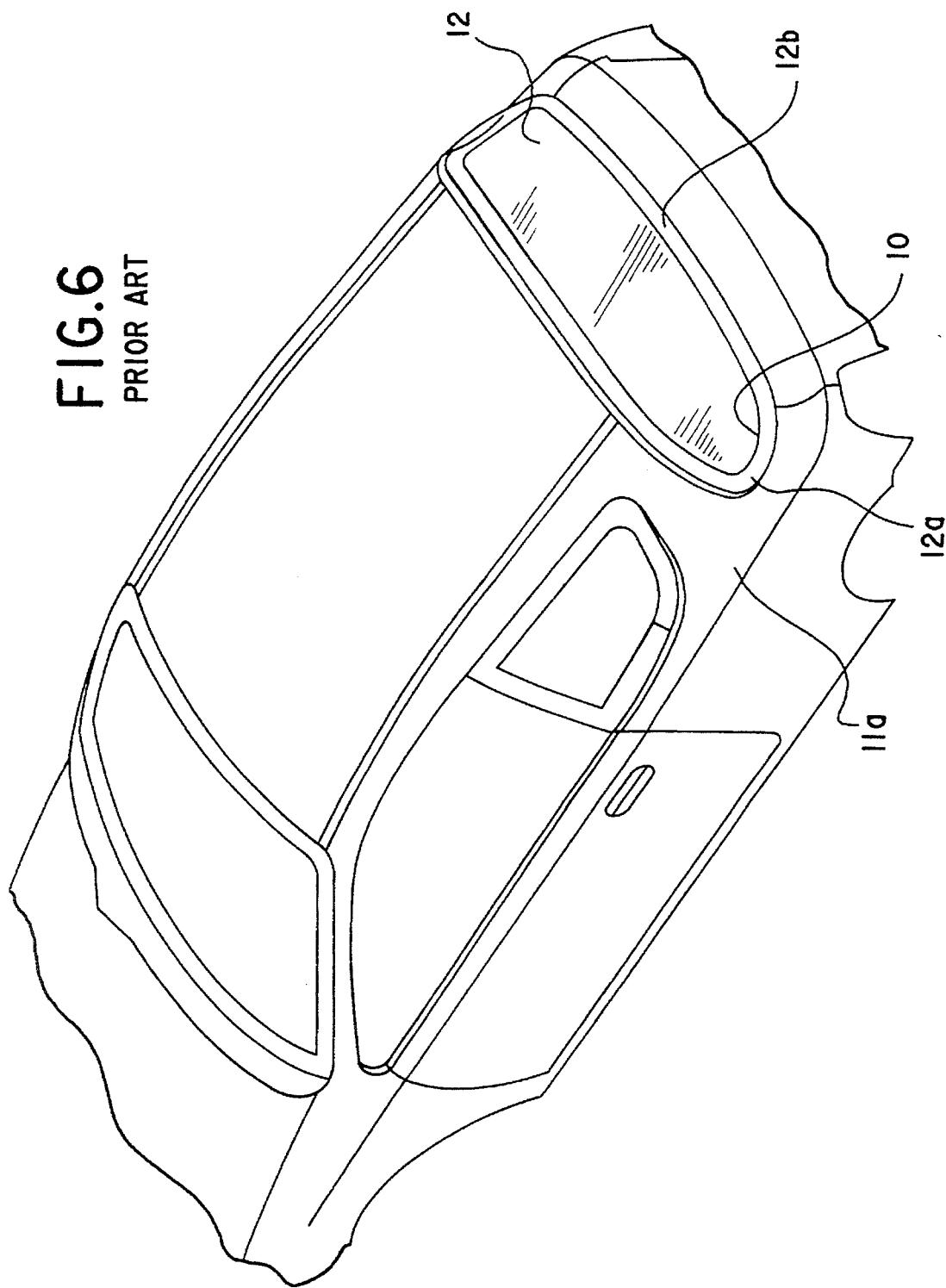
FIG. 6 is a fragmentary perspective view of a prior art automobile body including a rear window glass panel installed on an attachment frame.
Figure 7A:
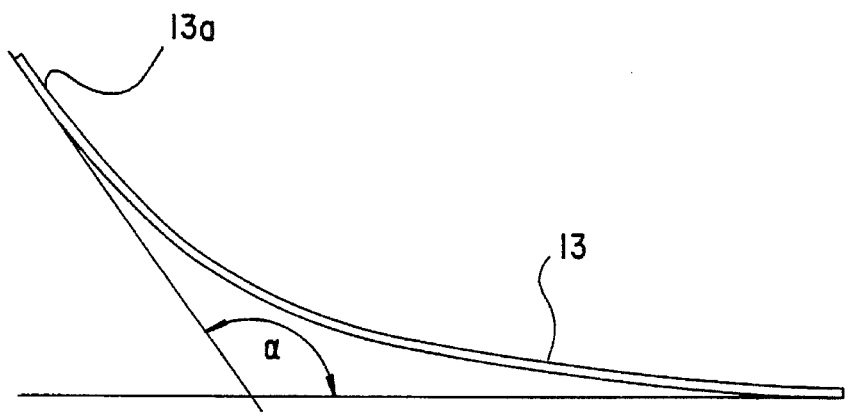
FIG. 7A is a plan view of a less sharply curved end portion of a curved prior art window glass panel.
Figure 7B:
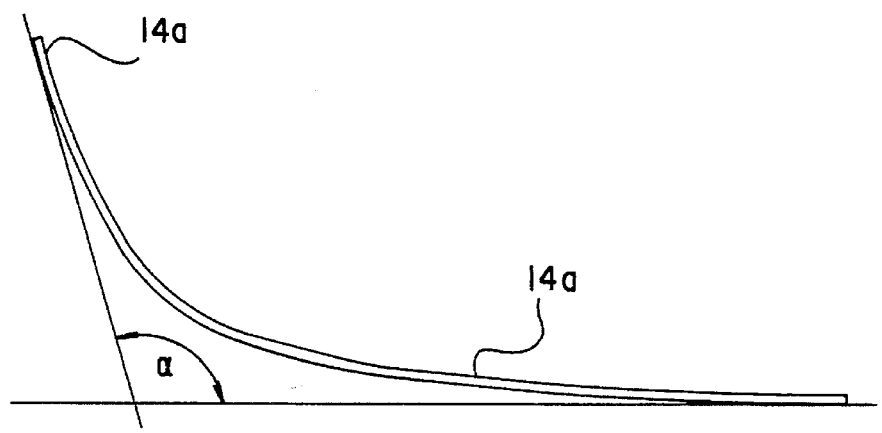
FIG. 7B is a plan view of a more sharply curved end portion of another curved prior art window glass panel.
Figure 8:
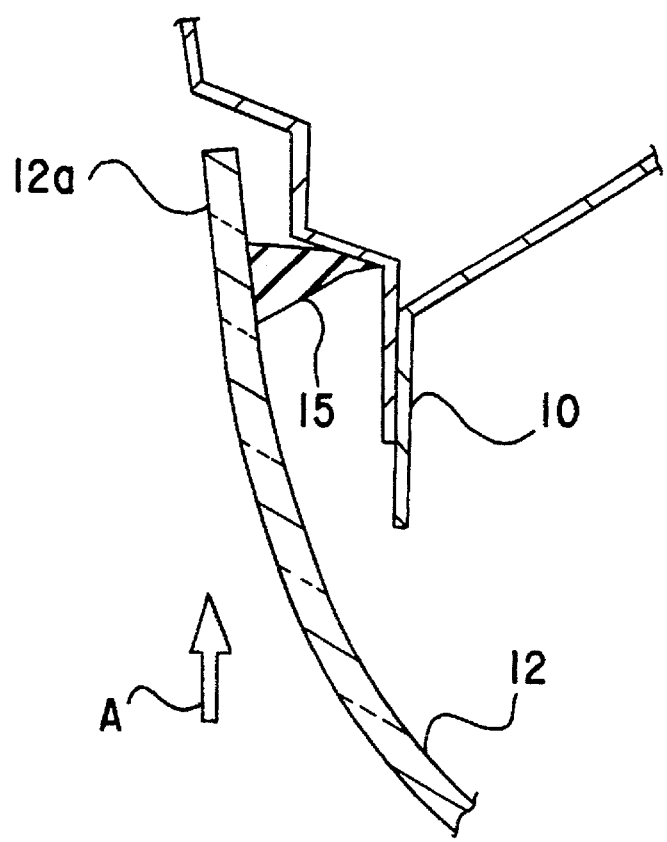
FIG. 8 is a fragmentary cross-sectional view of an end portion of the prior art rear window glass panel shown in FIG. 6, with a sealer interposed between the end portion and the attachment frame.

As shown in FIG. 5, the sealer retainer 4 extends along a curved edge of each of end portions 2a of the curved rear window glass panel 2 which are to be pressed against the rear window attachment frame 1. The peripheral edge of the curved window glass panel 2 is coated with a decorative ceramic color layer 2b.

The curved window glass panel 2 will be installed on the rear window attachment frame 1 as follows:

The curved window glass panel 2 is attracted by suction pads or the like, and pressed against the rear window attachment frame 1. At this time, the holders 3 on the curved window glass panel 2 engage the respective guide surfaces 1b. Specifically, the hook fingers 3b of the holders 3 are slidably guided by the respective guide surfaces 1b which engage the respective hook fingers 3b, so that the ends portions 2a of the curved window glass panel 2 are simultaneously guided into a predetermined lateral position with respect to the rear window attachment frame 1, as shown in FIGS. 2B and 4. At this time, the respective guide surfaces 1b engage and guide the respective hook fingers 3b which are positioned at the tip ends of the tapered bent end portions 2a of the curved window glass panel 2. Therefore, as the curved window glass panel 2 is guided upon being pressed against the rear window attachment frame 1, the curved window glass panel 2 is automatically positionally corrected out of any lateral displacement with respect to the rear window attachment frame 1. Possible angular errors of the bent end portions 2a of the curved window glass panel 2 can also be eliminated when the curved window glass panel 2 is forcibly guided by the holders 3 and the guide surfaces 1b. At the same time, the sealers 5 projecting in the direction in which the curved window glass panel 2 is pressed against the rear window attachment frame 1 are pressed between the rear window attachment frame 1 and the sealer retainers 4 thereby providing a reliable adhesive seal between the rear window and the rear window attachment frame 1. The end portions 2a bent through the angle ranging from 90° to 130° with respect to the central panel portion 2c allow the holders 3 to be effectively engaged and guided by the guide surfaces 1b, and also permit the sealers 5 to be securely pressed between the rear window 2 and the rear window attachment frame 1.

Inasmuch as no special control is required to install the curved window glass panel 2 on the rear window attachment frame 1, the curved window glass panel 2 can easily and reliably be installed on the rear window attachment frame 1 using an existing automatic installing machine. Because of the sealer 5 securely pressed between the curved window glass panel 2 and the rear window attachment frame 1, the curved window glass panel 2 which has been installed on the rear window attachment frame 1 is highly effective to provide a seal against water leakage along its peripheral edge.

Although there has been described what is at present considered to be the preferred embodiment of the invention, it will be understood that the invention may be embodied in other specific forms without departing from the essential characteristics thereof. The present embodiment is therefore to be considered in all respects as illustrative, and not restrictive. The scope of the invention is indicated by the appended claims rather than by the foregoing description.

What is claimed is:

1. A curved window glass panel for installation on an attachment frame on an automobile body, said automobile body having a window glass attachment frame fixed to said body and having a guide surface fixed to each of opposite ends of said frame, each guide surface having a slant surface, comprising:

a glass panel having a curved center portion; and a pair of bent end glass portions extending from opposite ends of said center glass panel portion, said attachment frame having a portion extending substantially parallel to each of the bent end portions and one of the slant surfaces extending from each substantially parallel attachment frame portion toward the bent end portion, each of said bent end glass portions having a holder on an inner surface of each of said bent end glass portions for, respectively, engaging said slant guide surface on each said guide surface fixed to a respective opposite end of said attachment frame for guiding each holder on said inner surface of said bent glass portion and said curved window glass panel inwardly into a predetermined position with respect to said attachment frame when said curved window glass panel is pressed against said attachment frame.

2. A curved window glass panel according to claim 1, said bent end glass portions each have a sealer retainer on respective inner surfaces thereof, said sealer retainers each having a slanted seat surface slanted with respect to said inner surfaces of the bent end glass portions, and a sealer disposed on each said slanted seat surface, said sealer projecting outwardly in a direction in which said curved window glass panel is pressed against said attachment frame.

3. A curved window glass panel according to claim 1 or 2, wherein said bent end portions are bent through an angle ranging from 90 degrees to 130 degrees.

4. A curved window glass panel for installation on an attachment frame on an automobile body, said attachment frame having a guide surface fixed to each of opposite ends of said frame, each guide surface having a slant surface, comprising:

a glass panel having a central portion; and a pair of tapered bent end glass portions extending from opposite ends of said central glass panel portion, said attachment frame having a portion extending substantially parallel to each of the bent end portions and one of the slant surfaces extending from each substantially parallel attachment frame portion toward the bent end portion, said bent end glass portions each having a holder, respectively, on an inner surface of each of said tapered bent end glass portions at the tip end thereof for, respectively, engaging said slant surface on each said guide surface fixed to said opposite ends of said attachment frame for guiding each holder on an inner surface of said tapered bent glass portion and said curved window glass panel inwardly into a predetermined position with respect to said attachment frame when said curved window glass panel is pressed against said attachment frame.

\* \* \* \* \*